UNITED STATES PATENT OFFICE.

EDWARD GREPPIN, OF BASLE, SWITZERLAND, ASSIGNOR TO JEAN ROD. GEIGY, OF SAME PLACE.

PROCESS FOR THE PRODUCTION OF BLUE COLORING-MATTER.

SPECIFICATION forming part of Letters Patent No. 368,716, dated August 23, 1887.

Application filed January 6, 1887. Serial No. 223,580. (Specimens.)

*To all whom it may concern:*

Be it known that I, EDWARD GREPPIN, doctor of philosophy, of Basle, Switzerland, have invented a certain new and useful Process for the Production of Blue Coloring-Matters, called "Gentiamine," of which the following is a specification.

The said invention has for its object the production of blue coloring-matters by the oxidation of a mixture of paramido-dimethylaniline and paraphenylendiamine in the presence of sulphureted hydrogen in acid solution.

Instead of paraphenylendiamine, I can as well take paratoluylendiamine, (paradiamidotoluol,) and instead of paramido-dimethylaniline the derivations of diethylaniline, dimethylaniline, dimethyl-orthotoluidine, methylethyl-orthotoluidine.

Heretofore an intended blue coloring-matter was obtained by heating two molecules of paraphenylendiamine with one molecule of sulphur leuco base of Lauth's violet:

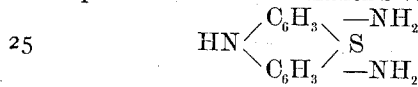

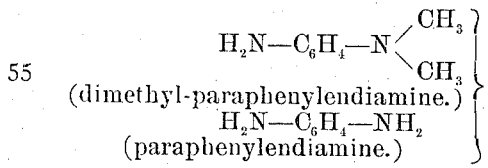

Thus I have in my product one molecule of paraphenylendiamine and one molecule of dimethyl-paraphenylendiamine.

I claim—

A new article of manufacture produced by the oxidation of a mixture of paramido-dimethylaniline or the derivations of diethylaniline, dimethylaniline, dimethyl-orthotoluidine, methylethyl-orthotoluidine, and paraphenylendiamine or paratoluylendiamine, (paradiamidotoluol,) in the presence of sulphureted hydrogen in acid solution.

which is transformed by oxidation into the coloring-matter whose base has the following formula:

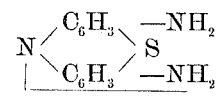

My product is obtained by treating one molecule of paraphenylendiamine and one molecule of dimethyl-paraphenylendiamine with sulphureted hydrogen and an oxidizing substance. This new color is of unsymmetrical structure, as is to be seen by the following formula:

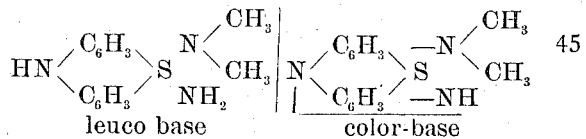

of my product. The reaction is represented by the formula:

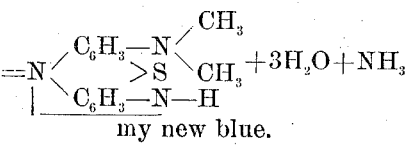

In testimony whereof I hereunto sign my name, in the presence of two subscribing witnesses, this 21st day of December, 1886.

EDWARD GREPPIN.

Witnesses:
 GEORGE GIFFORD,
 CHS. A. RICHTER.